United States Patent
Parnell et al.

(10) Patent No.: US 9,347,598 B1
(45) Date of Patent: May 24, 2016

(54) PIPELINE SLEEVE ATTACHMENT METHOD AND APPARATUS

(71) Applicant: Web Service Development

(72) Inventors: Terry Parnell, Holliday, TX (US); Steve Parnell, Holliday, TX (US)

(*) Notice: Subject to any disclaimer, the term of this patent is extended or adjusted under 35 U.S.C. 154(b) by 0 days.

(21) Appl. No.: 14/948,120

(22) Filed: Nov. 20, 2015

(51) Int. Cl.
*F16L 55/18* (2006.01)
*F16L 55/17* (2006.01)

(52) U.S. Cl.
CPC *F16L 55/18* (2013.01); *F16L 55/17* (2013.01)

(58) Field of Classification Search
CPC .................................. B66F 8/061; B66F 7/065
See application file for complete search history.

(56) References Cited

U.S. PATENT DOCUMENTS

| | | | | |
|---|---|---|---|---|
| 2,817,556 A * | 12/1957 | White | ..................... | F16B 45/06 254/29 R |
| 3,561,615 A * | 2/1971 | Forsberg | ................. | F16L 1/09 29/237 |
| 4,039,087 A * | 8/1977 | Sandvick, Sr. | ........... | F16L 1/09 254/29 R |
| 4,069,902 A * | 1/1978 | Zdeb | ....................... | F16D 41/16 192/43 |
| 5,253,844 A * | 10/1993 | Cotic | ..................... | B25B 31/00 254/131 |
| 6,857,619 B1 * | 2/2005 | Jangula | ..................... | E02F 3/96 254/132 |
| 8,505,879 B2 * | 8/2013 | Ruan | ...................... | B25B 13/48 254/232 |
| 2008/0217594 A1 * | 9/2008 | Kirker | ................ | A47G 27/0493 254/212 |
| 2011/0253956 A1 * | 10/2011 | Smetz | ..................... | F16G 3/006 254/100 |
| 2014/0326935 A1 * | 11/2014 | Chao | ....................... | B60P 7/083 254/235 |

* cited by examiner

*Primary Examiner* — Lee D Wilson
(74) *Attorney, Agent, or Firm* — Law Office of Jeff Williams; J. Oliver Williams

(57) ABSTRACT

The present application includes a device and method for securing a sleeve around a pipeline in order to thicken an area of the pipe. The device includes a plurality of leg assemblies configured to pivot relative to one another in a scissor motion. Wheels are located at the bottom end of the leg assemblies and contact a surface of the upper sleeve half. A strap device is wrapped around the top and bottom sleeve halves and coupled to the device. A ratcheting device is used to controllably tighten the strap around the sleeve and pipeline. As the device tightens, the scissor motion causes the wheels to roll along the sleeve. Tightening the strap device generates a radial compressive force around the sleeve and holds it in place until the sleeve is permanently secured to the pipeline.

12 Claims, 5 Drawing Sheets

PIPELINE SLEEVE ATTACHMENT METHOD AND APPARATUS

BACKGROUND

1. Field of the Invention

The present application relates generally to oil and gas pipeline repair and maintenance, more particularly, to a device for securing a sleeve around the pipelines.

2. Description of Related Art

There are hundreds of thousands of miles of pipelines. Over time, pipelines tend to lose thickness from corrosion and/or deterioration. Pipelines with decreased thicknesses are subject to a greater risk of failure. There are different ways to repair pipelines that have been discovered to have decreased thickness. One way is to thicken that particular area of the pipe by installing a sleeve around the pipe. The sleeve needs to be held in place and secured.

Currently, the sleeves come in two halves. The upper half is typically laid across the surface of the pipe. The lower half is lifted up with a hydraulic jack to meet the upper portion. A weakness of the current methods is the use of the chains. Chains are wrapped around the pipeline and sleeve halves and have a tendency to break or fly off. Another disadvantage is that the hydraulic jacks tend to provide a lifting force only. Merely lifting the bottom half fails to obtain the tight fit required when welding the halves together.

It is desirable to have a better tool that can maneuver around the pipe and sleeves and provide radial compressive forces around the sleeve as opposed to merely a unidirectional lifting force. Although some strides have been made in repairing and maintaining pipelines, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
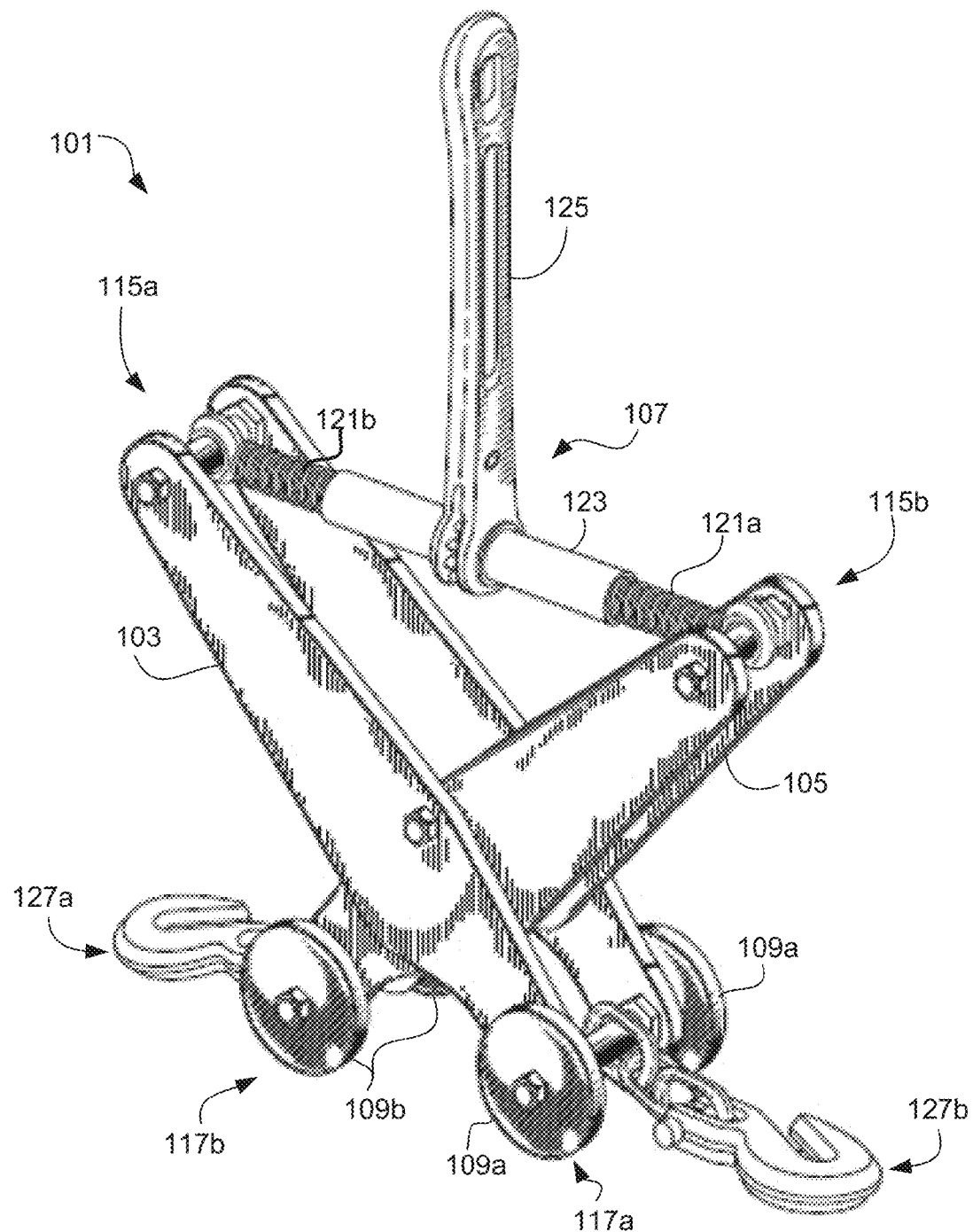
FIG. 1 is a perspective view of a pipeline sleeve attachment device according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system in accordance with the present application overcomes one or more of the above-discussed problems commonly associated with conventional hydraulic devices. Specifically, the device of the present application is configured to compress two halves of a sleeve around a pipeline. The sleeve acts to increase the thickness of the wall of the pipeline when corrosion has been detected. The sleeve is secured to the pipeline while held in place by the pipeline sleeve device. The device is configured to apply a radial compressive force around the surface of the sleeve in order to properly bring the two halves together. While applying the radial compressive force, the device is configured to roll along an outer surface of the sleeve in order to maintain consistent and equal forces. These and other unique features of the system are discussed below and illustrated in the accompanying drawings.

The device and method will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The pipeline sleeve attachment system of the present application is illustrated in the associated drawings. The system includes a plurality of leg assemblies configured to pivot in a scissor motion about a single pivot point. A ratcheting device is configured at a first end of the leg assemblies to adjust the width of the leg assemblies in the scissor. Once a strap device is secured around the sleeve on the pipeline, decreasing of the width of the leg assemblies in the scissor compresses the sleeve together.

Figure 2:
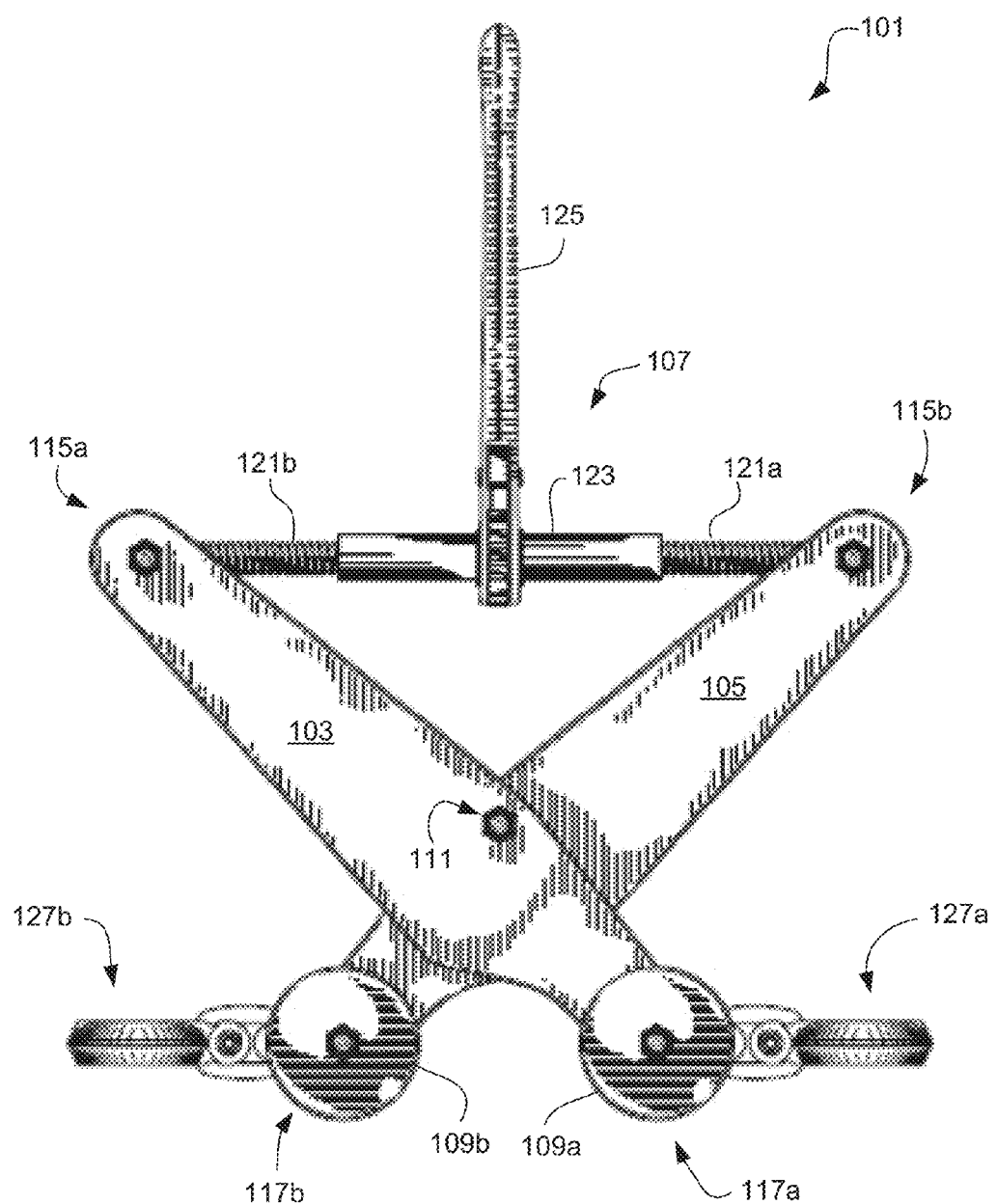
FIG. 2 is a front view of the pipeline sleeve attachment device of FIG. 1.
Figure 3:
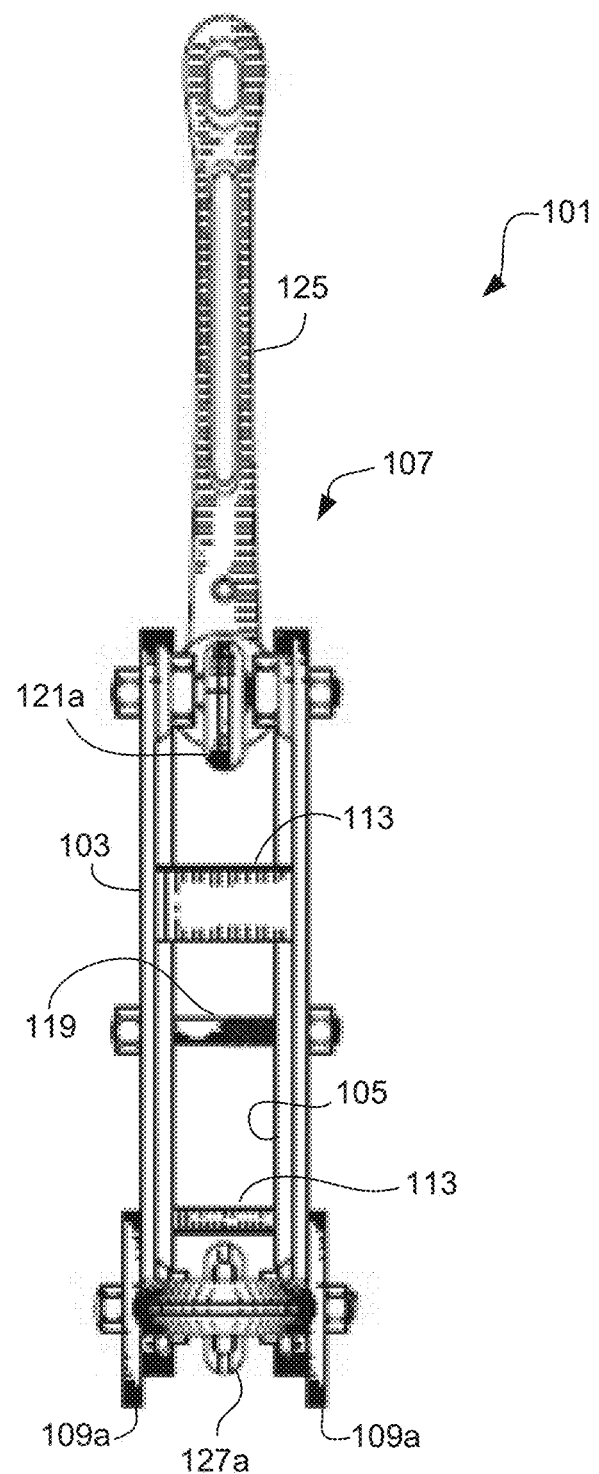
FIG. 3 is a side view of the pipeline sleeve attachment device of FIG. 1.

Referring now to the drawings wherein like reference characters identify corresponding or similar elements in form and function throughout the several views. FIGS. 1-3 in the drawings illustrate pipeline sleeve attachment device 101. Device 101 includes an outer leg assembly 103, an inner leg assembly 105, a ratcheting device 107, and wheels 109a and 109b. Device 101 is configured to adjust in width in a scissor motion to allow device 101 to incrementally tighten a strap device around two halves of a sleeve.

Device 101 is defined primarily by the inclusion of two leg assemblies, namely outer leg assembly 103 and inner leg assembly 105. Both leg assemblies 103 and 105 are coupled together and configured to pivot relative to one another in a scissor motion about pivot point 111. Each leg assembly is configured in this embodiment to have two legs that are separated by the use of a spacer 113. Spacer 113 is located in upper and lower portions of each leg assembly 103, 105 and are selectively sized to accommodate the necessary gap between each set of legs. Inner leg assembly 105 is configured to pivot between the legs of outer leg assembly 103. It is understood that device 101 is not herein limited to the use of two legs. Any number of one or more legs may be used.

Each leg assembly includes two opposing ends, a first end 115a and 115b and a second end 117a and 117b, each for assemblies 103 and 105 respectively. Pivot point 111 is denoted by a bolt 119 that passes through both assemblies 103 and 105. Locating pivot point 111 between ends 115 and 117 allows for the scissor motion to occur. As the distance between ends 115 of each assembly is decreased, the distance between the assemblies at ends 117 are also simultaneously decreased. The opposite is true as well wherein the distances may be increased.

The actuation or adjusting of the distances between the ends 115 and 117 is done through the use of ratcheting device 107. Ratcheting device 107 is configured to induce pivoting of the assemblies 103 and 105 relative to one another about point 111. Such pivoting of assemblies 103 and 105 induces a radial compressive force to be applied to the sleeve around the pipeline as discussed more thoroughly in FIGS. 4-7 below. Ratcheting device 107 is operable herein along first ends 115a and 115b. Ratcheting device 107 includes a threaded rod 121a and 121b in communication with each first end 115a, 115b respectively. A threaded sleeve 123 is operable with and in communication around rods 121a and 121b. Each rod 121a, 121b is in threaded engagement with sleeve 123 through opposing ends. Rods 121a, 121b may be threaded to have opposing thread directions (i.e. right hand threads and/or left hand threads) to allow for the simultaneous and opposite movements relative to sleeve 123. Additionally, the internal threading of sleeve 123 is configured to match the individual threading of rods 121a, 121b. Rotation of sleeve 123 simultaneously threads rods 121a and 121b into or out of sleeve 123.

Ratchet 125 is included within ratcheting device 107 and is configured to engage sleeve 123 and permit a user leverage to rotate sleeve 123. Ratchet 125 is configured to rotate around sleeve 123 in a bi-directional manner. Operation of ratchet 125 is similar to that of conventional ratchets wherein the ratchet may be set to rotate sleeve in either direction (i.e. counter clockwise or clockwise). By changing the setting on ratchet 125 and rotating sleeve 123 in the different directions, leg assemblies 103 and 105 are configured to widen or narrow.

At second ends 117, each leg assembly includes one or more wheels 109a and 109b. Wheels 109 are configured to roll along an outer surface of the sleeve as the leg assemblies 103 and 105 are pivoted. This is done to avoid situations where the device may bind around the sleeve. Wheels 109 allow leg assemblies 103 and 105 to move freely across the surface of the sleeve. The wheels 109 are coupled to one or more legs of the leg assemblies.

Further included in device 101 is the use of an optional attachment member 127a and 127b. Device 101 may include one or both of devices 127. Member 127 is coupled to end 117 in a loose fitting manner. Member 127 is configured to securely clasp or hold a strap device (see FIGS. 4-7). Member 127 may be interchangeable and removable from device 101. Member 127 may be a hook or clasp for example. Member 127 may be open or closed with or without a closure mechanism.

Figure 4:
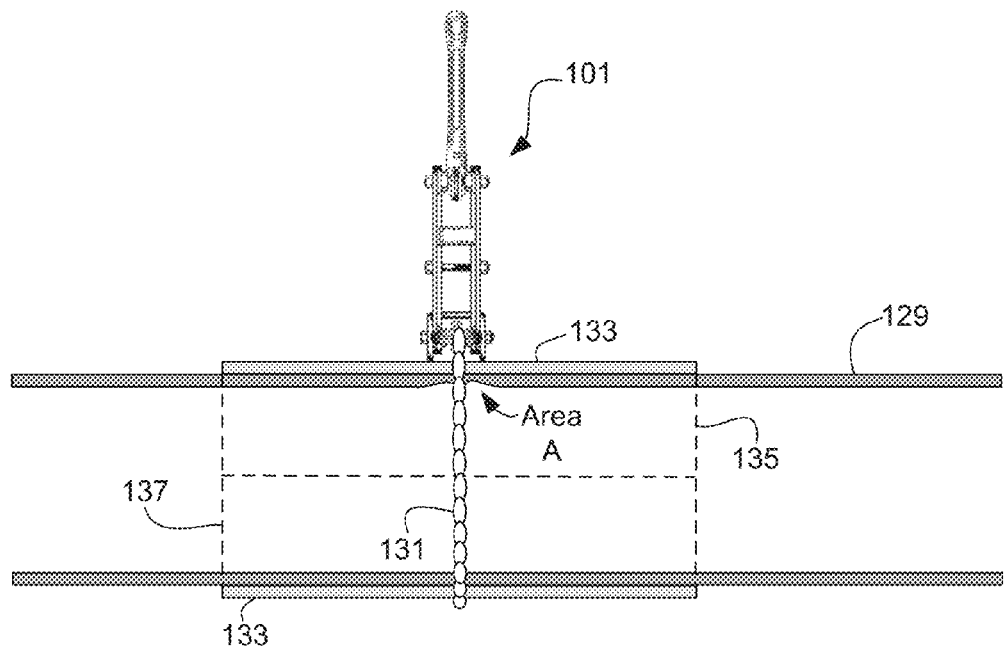
FIG. 4 is a side section view of the pipeline sleeve attachment device of FIG. 1 in communication with a pipeline and sleeve.
Figure 5:
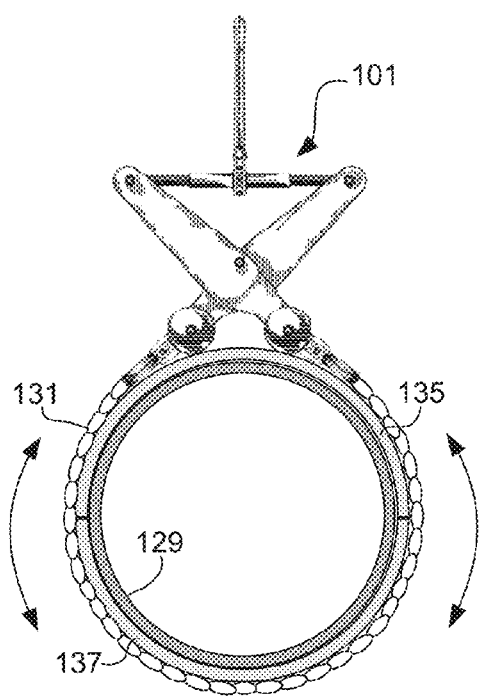
FIG. 5 is an end view of the pipeline sleeve attachment device, pipeline, and sleeve of FIG. 4.

Referring now to FIGS. 4 and 5 in the drawings, device 101 is illustrated on top of sleeve 133, with sleeve 133 surrounding pipeline 129. FIG. 4 illustrates a partial side section view of pipeline 129 and sleeve 133. Device 101 is coupled to a strap device 131. Strap device 131 is configured to wrap around sleeve 133 and couple to one or more attachment members 127. Once secured to member(s) 127, ratcheting device 107 is operated to narrow the distance between ends 117, thereby squeezing device 131 around sleeve 133. FIG. 5 illustrates an end view of pipeline 129, showing device 131 around the circumference of pipeline 129 and coupled to members 127. It is understood that device 131 may be more than the chain depicted. Examples of device 131 may be a chain, rope, chord, strap, or other material. It is also important to note that device 131 is interchangeable from member 137, wherein device 131 may be partially or fully removed. Some situations and sizings of pipeline 129 may require different loads and therefore different types of strap devices 131.

In operation, device 101 is configured to be easy to operate and safe. A user first locates a first half 135 of sleeve 133 on an upper portion of pipeline 129. The location is determined by the area of corrosion or decreased thickness. This area is denoted as Area A on FIG. 4. The length of sleeve 133 is determined by regulations to ensure sufficient coverage either side of Area A. Once the upper half 135 is located, device 101 is also positioned in contact with half 135. Device 101 is adjusted so that the distance between ends 115 are increased to a sufficiently wide position. Strap device 131 is secured to one of the members 127 and wrapped around pipeline 129. The lower half 137 of sleeve 133 is aligned with half 135 and located between device 131 and pipeline 129. The opposite end of device 131 is attached to device 101. The length of strap device 131 is adjusted to remove excess slack. Once arranged, ratcheting device 107 is operated to narrow device 101, meaning the distance between ends 117 is decreased, thereby increasing the pressure around sleeve 133. The force is a radial compressive force configured to equally apply pressure across the surface of sleeve 133. This force secures sleeve 133 in place to allow users to bond/secure/weld sleeve 133 in place to pipeline 129. It is important to note that wheels 109 are configured to rotate freely as the distance changes between ends 117. Once secured, device 131 is removed at least partially from device 101. Ratcheting device 107 may be used to carefully and safely release the pressure applied to device 131

Figure 6:
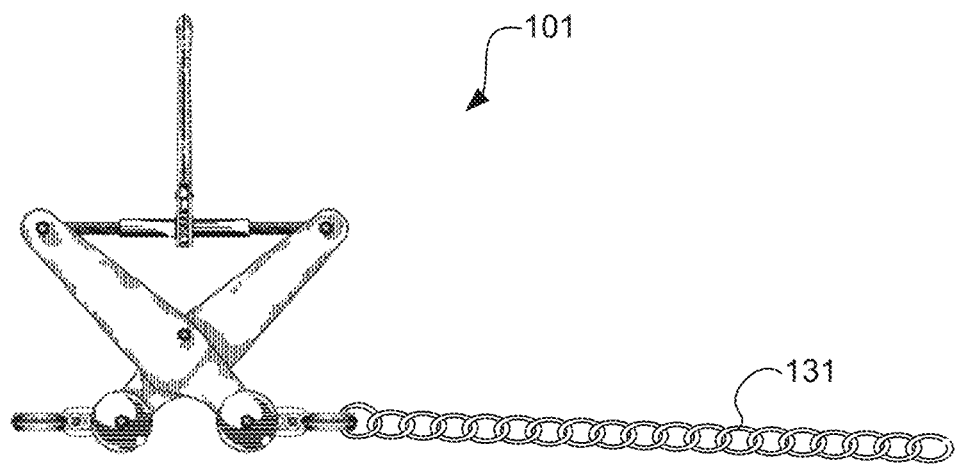
FIG. 6 is a front view of the pipeline sleeve attachment device of FIG. 1, with a chain.
Figure 7:
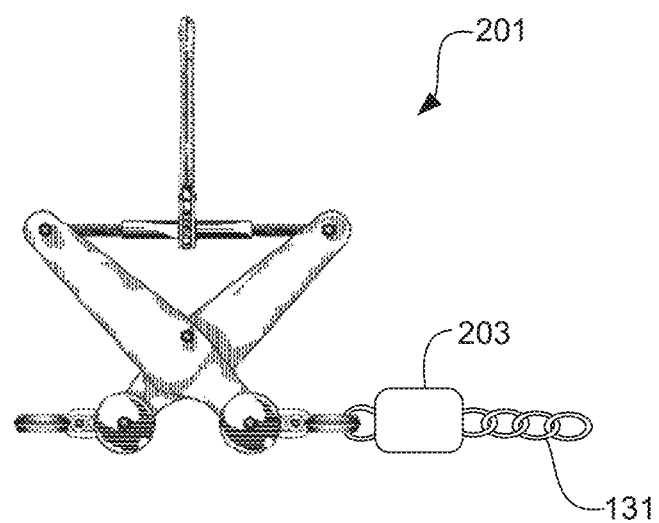
FIG. 7 is a front view of an alternative embodiment of the pipeline sleeve attachment device of FIG. 1, having a winch to store a chain.

Referring now also to FIG. 6 in the drawings, device 101 is shown wherein the strap device 131 is integrally coupled to member 127a. In FIG. 7, an alternative embodiment of pipeline sleeve attachment device 101 is illustrated. In some instances, strap device is interchanged depending on the size of piping 129 and the expected stresses to be experienced.

This requires the need for a user to potentially have to carry multiple types and lengths of strap devices 131. In this embodiment, pipeline sleeve attachment device 201 is similar in form and function to that of device 101 except that device 201 further includes a storage device 203. Storage device 203 is configured to selectively house and store strap device 131. Storage device 203 is configured to selectively wind up strap device 131 when desired by the user. Under the same principle, storage device 203 is configured to selectively release incremental lengths of strap device 131. As seen in FIG. 7, storage device 203 is coupled to one of the leg assemblies. This may be directly to the leg assembly or through any of the attachment members. An advantage of device 201 is that strap 131 is sufficiently strengthened to handle all potential loads and that the selected length feature of the storage device alleviates the need to interchange the strap device as frequently. An example of device 203 in use would be where device 201 is placed on the sleeve and the user unwinds from the storage device an appropriate amount of strap without worry of the excess. The storage device has an automatic lock to prevent uncontrolled winding when tension is released from the strap. It is understood that storage device may be any number of devices, namely and example could be that of a winch.

Materials in device 101 are commonly known to those in the field. Device 101 is engineered to aid in the installation and alignment of pipe sleeve materials onto steel pipes. Device 101 is capable of handling sleeves of various sizes. Device 101 is configured to stay in place relative to the pipeline during ratcheting and can hold the sleeve in place until it is securely fastened to the pipeline. Using device 101 increases safety and the speed at which pipeline sleeves can be installed.

The current application has many advantages over the prior art including at least the following: (1) increased safety; (2) increased ease of use; (3) wheeled contact with the sleeve; (4) retractable strap feature; and (5) uniform radial compressive force applied around the circumference of the sleeve.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A pipeline sleeve attachment device, comprising:
    an outer leg assembly;
    an inner leg assembly, the outer leg assembly and the inner leg assembly being coupled together to permit relative pivoting between each assembly;
    a ratcheting device coupled to a first end of the outer leg assembly and the inner leg assembly, the ratcheting device configured to induce the pivoting of each assembly; and
    a first wheel and a second wheel in communication with a second end of the outer leg assembly and the inner leg assembly, the second end being opposite that of the first end, the first and the second wheel being configured to contact and roll along an outer surface of a sleeve as the outer leg assembly and the inner leg assembly pivot.

2. The pipeline sleeve attachment device of claim 1, wherein the ratcheting device is configured to pivot the outer leg assembly and the inner leg assembly in order to induce a radial compressive force around the sleeve.

3. The pipeline sleeve attachment device of claim 1, wherein the outer leg assembly includes a first spacer configured to separate two opposing legs.

4. The pipeline sleeve attachment device of claim 3, wherein the inner leg assembly pivots between the opposing legs of the outer leg assembly.

5. The pipeline sleeve attachment device of claim 1, wherein the inner leg assembly includes a second spacer configured to separate two opposing legs.

6. The pipeline sleeve attachment device of claim 1, wherein the inner leg assembly and the outer leg assembly are configured to pivot in a scissor motion wherein the distance between the two ends of the outer leg assembly and the inner leg assembly move in the same direction simultaneously.

7. The pipeline sleeve attachment device of claim 1, further comprising:
    a strap device configured to wrap around the sleeve and couple to the inner leg assembly and the outer leg assembly.

8. The pipeline sleeve attachment device of claim 7, wherein the strap device is at least one of a chain, a cable, and a fibered rope.

9. The pipeline sleeve attachment device of claim 1, further comprising:
    a first attachment member coupled to the second end of the outer leg assembly; and
    a second attachment member coupled to the second end of the inner leg assembly;
    wherein the attachment members are configured to selectively grasp a strap device.

10. The pipeline sleeve attachment device of claim 9, wherein the strap device is at least one of a chain, a cable, and a fibered rope.

11. The pipeline sleeve attachment device of claim 9, wherein the strap device is interchangeable from the attachment member so as to adjust in length.

12. The pipeline sleeve attachment device of claim 1, further comprising:
    a storage device configured to selectively house and store a strap device, the storage device being coupled to a portion of at least one of the outer leg assembly and the inner leg assembly, the winch configured to permit the selective winding and selective release of the strap device.

\* \* \* \* \*